United States Patent [19]
Dupouy

[11] Patent Number: 6,057,845
[45] Date of Patent: May 2, 2000

[54] SYSTEM, METHOD, AND APPARATUS FOR GENERATION AND RECOGNIZING UNIVERSAL COMMANDS

[75] Inventor: David J. Dupouy, Paris, France

[73] Assignee: Sensiva, Inc., Mountain View, Calif.

[21] Appl. No.: 08/970,306

[22] Filed: Nov. 14, 1997

[51] Int. Cl.$^7$ .............................. G06F 3/14; G06F 15/16
[52] U.S. Cl. ..................... 345/358; 345/333; 345/334; 345/326; 382/187; 382/186; 382/189
[58] Field of Search ..................... 345/358, 333, 345/334, 326, 179; 382/187, 188, 189, 186

[56] References Cited

U.S. PATENT DOCUMENTS

| | | | |
|---|---|---|---|
| 4,953,226 | 8/1990 | Matsuyama | 382/189 |
| 5,252,951 | 10/1993 | Tannenbaum et al. | 345/358 |
| 5,526,440 | 6/1996 | Sakano et al. | 382/187 |
| 5,590,257 | 12/1996 | Forcier | 707/530 |
| 5,592,565 | 1/1997 | Shojima et al. | 382/188 |
| 5,596,656 | 1/1997 | Goldberg | 382/186 |
| 5,742,280 | 4/1998 | Ohyama | 345/173 |
| 5,812,697 | 9/1998 | Sakai et al. | 382/186 |
| 5,828,783 | 10/1998 | Ishigaki | 382/186 |

OTHER PUBLICATIONS

Online Article: Crotty, "Graffiti 1.01", May 1995—Magazine Review, http://www.macworld.com./pages/may.95/Reviews.620.html, Nov. 6, 1997.

Online Article: Miller, "Graffiti Arrives!—Press Release enclosed", http://www.grot.com/zoomer/zoomer-list/zoomer-list-3Q1994/0048.html.

*Primary Examiner*—Raymond J. Bayerl
*Assistant Examiner*—Thomas T. Nguyen
*Attorney, Agent, or Firm*—Cooley Godward LLP

[57] ABSTRACT

A universal command generator that generates commands that are recognizable by multiple contexts, where the universal command libraries are loaded automatically and dynamically as the user switches from context to context. Additionally, a novel gesture recognition method is provided to allow the user to define symbols specific to the users preferences that will work universally. The preferred embodiment of the present invention comprises novel methods and apparatus that provide this functionality such as: a method for translating signals from an input device into commands operating on a context-sensitive basis, a method for recognizing and translating a command received from an input device into a command recognizable by a second context, and a device for interpreting and translating commands entered into a first device into commands that are understandable by a second device.

24 Claims, 16 Drawing Sheets

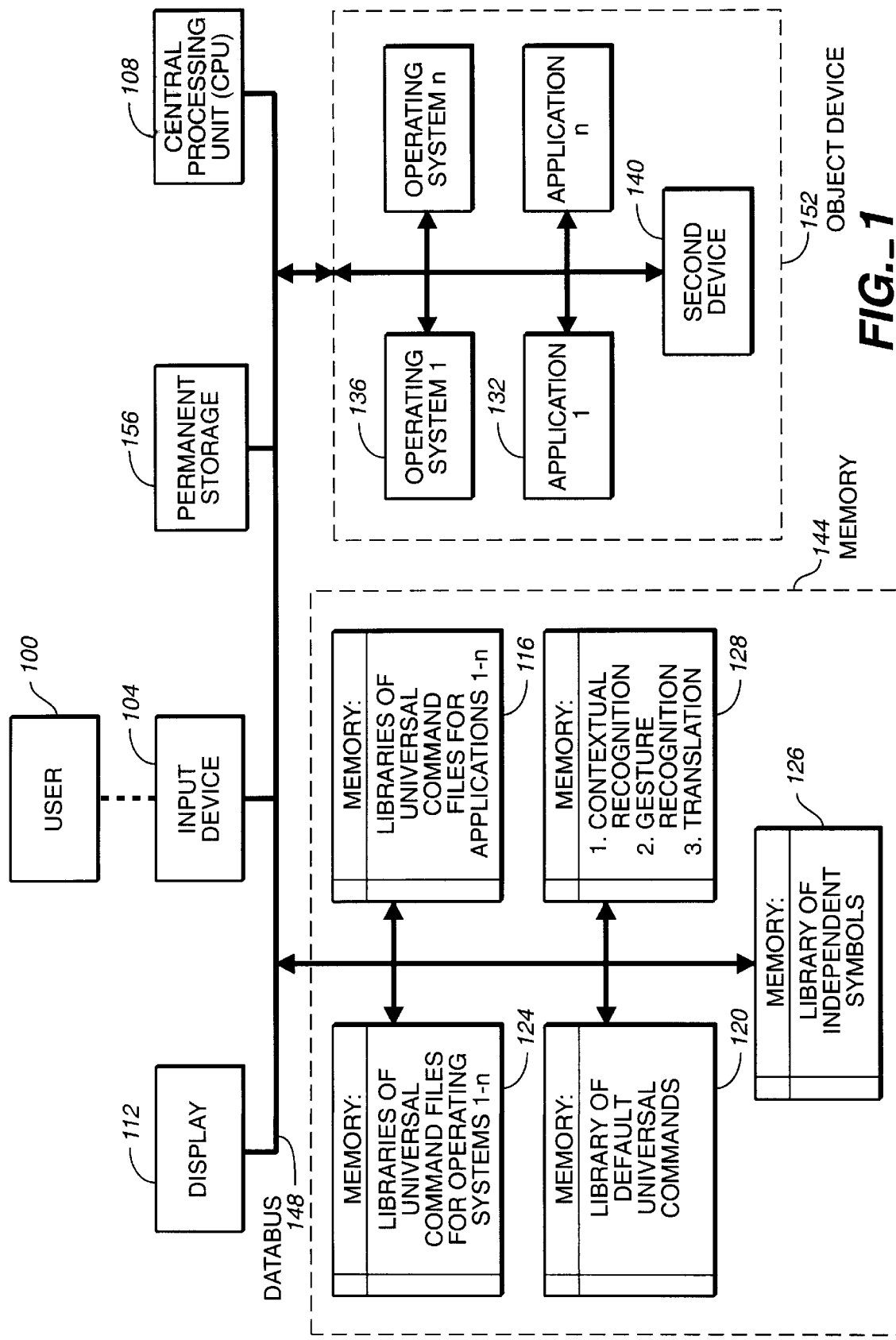
FIG._1

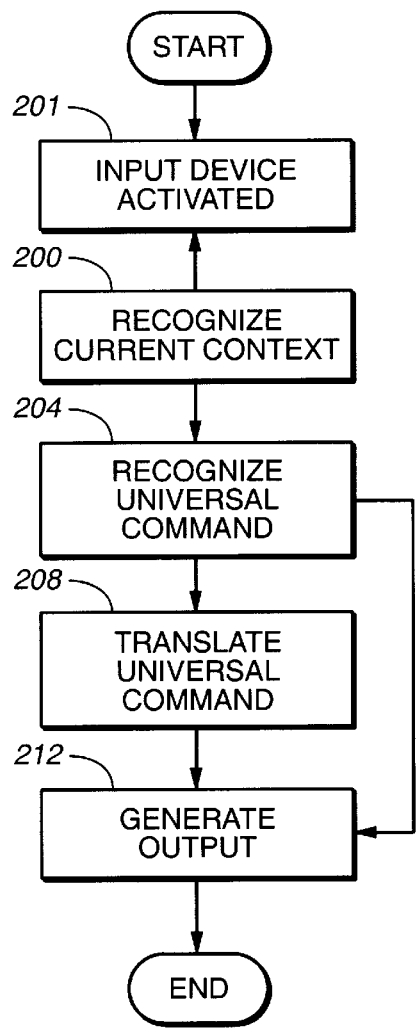
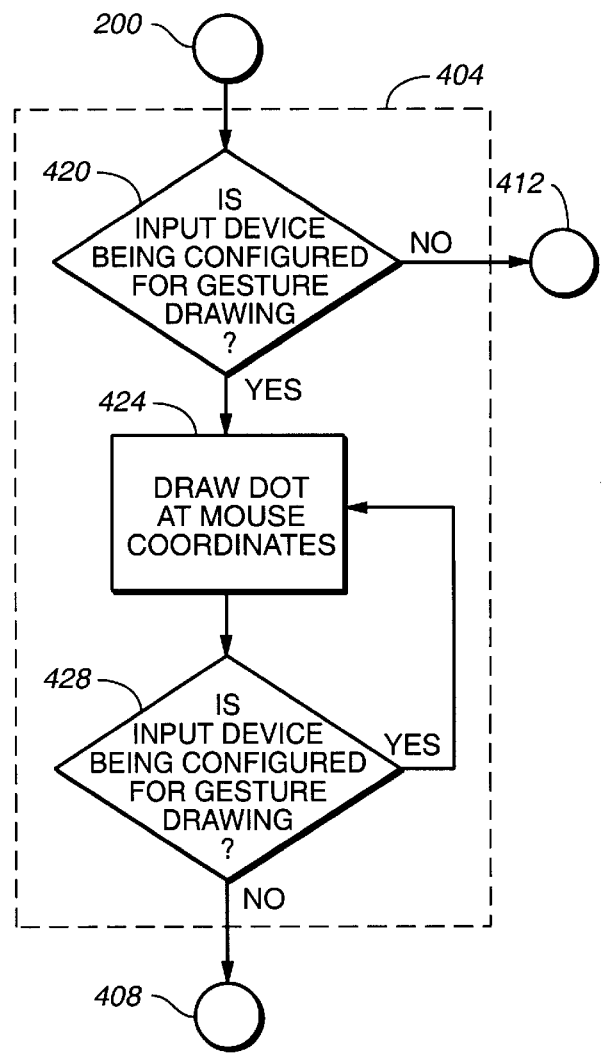
FIG._2
FIG._4b

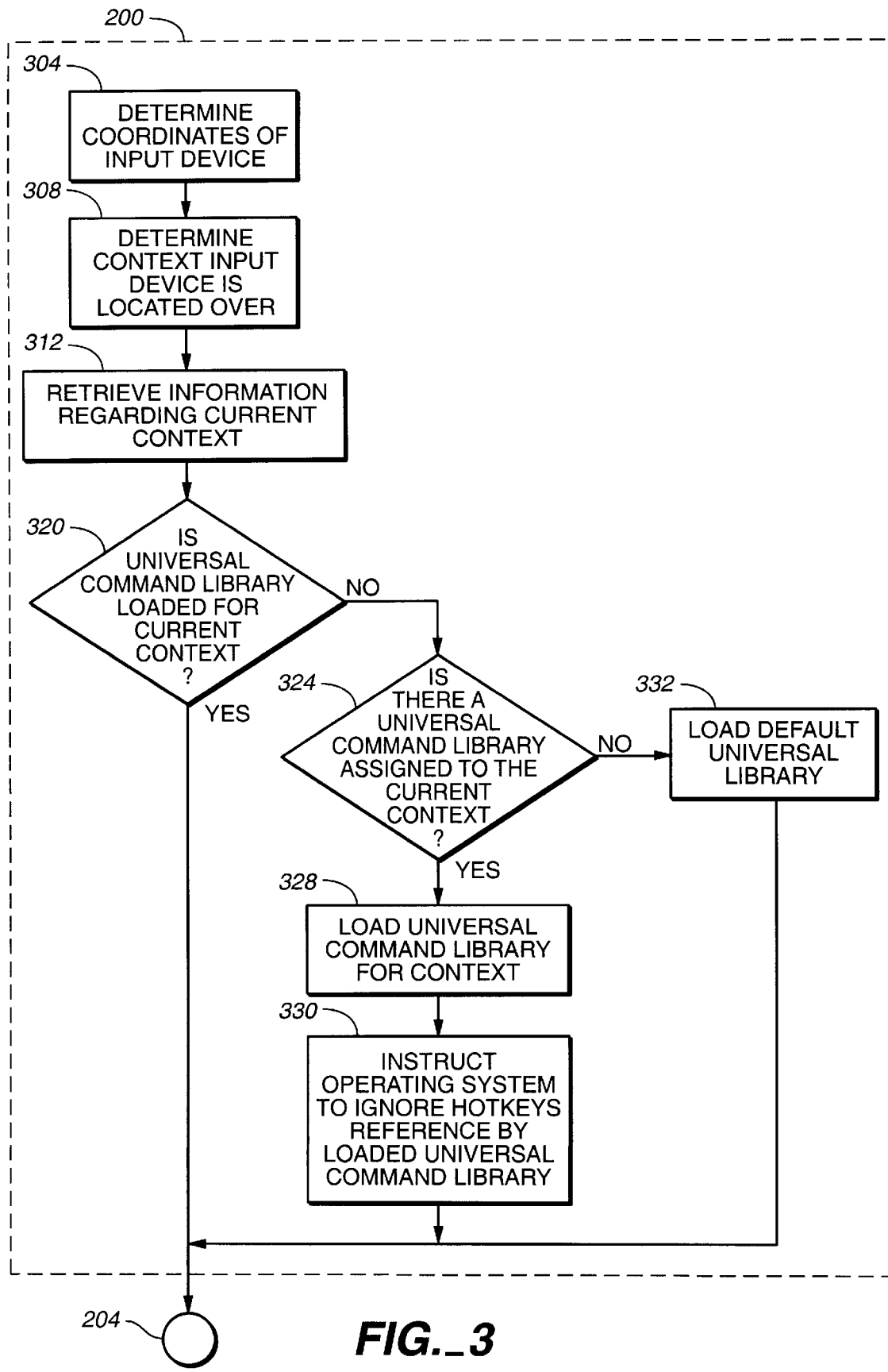
FIG._3

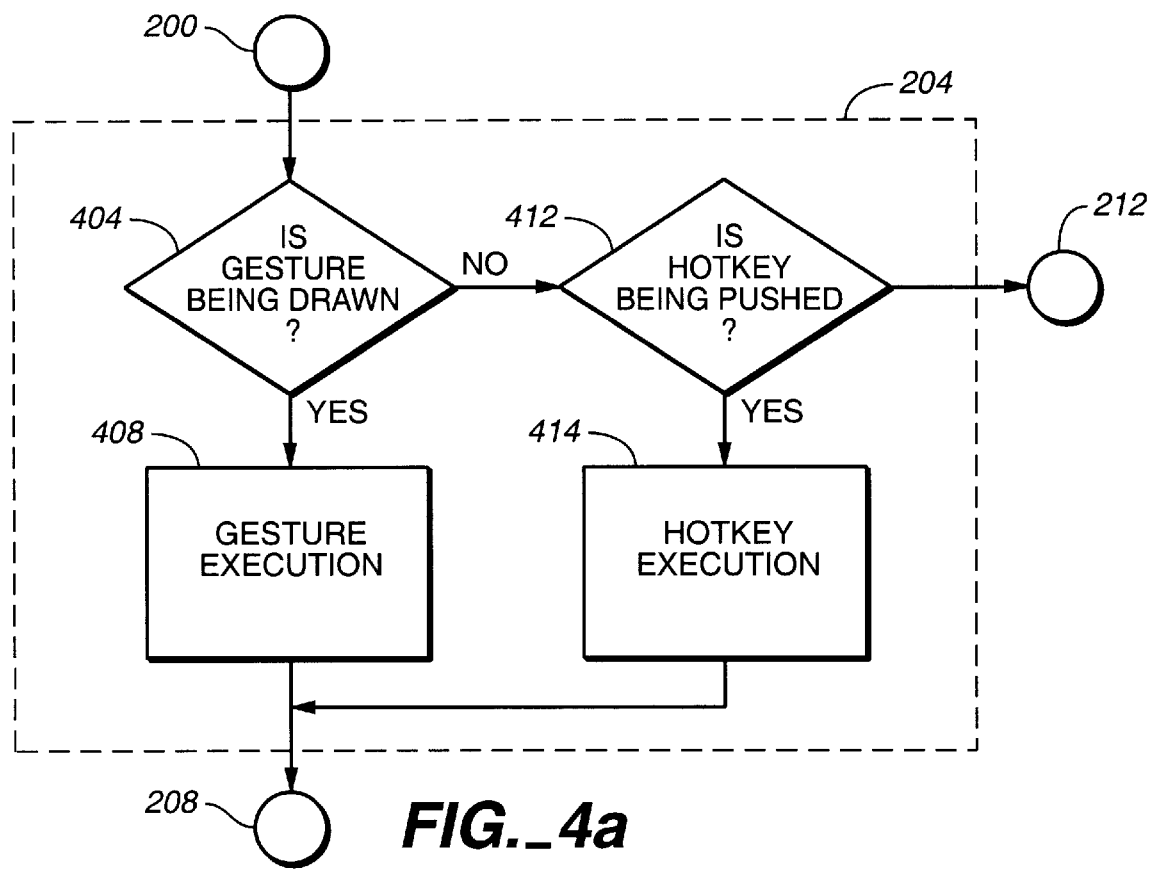
FIG._4a

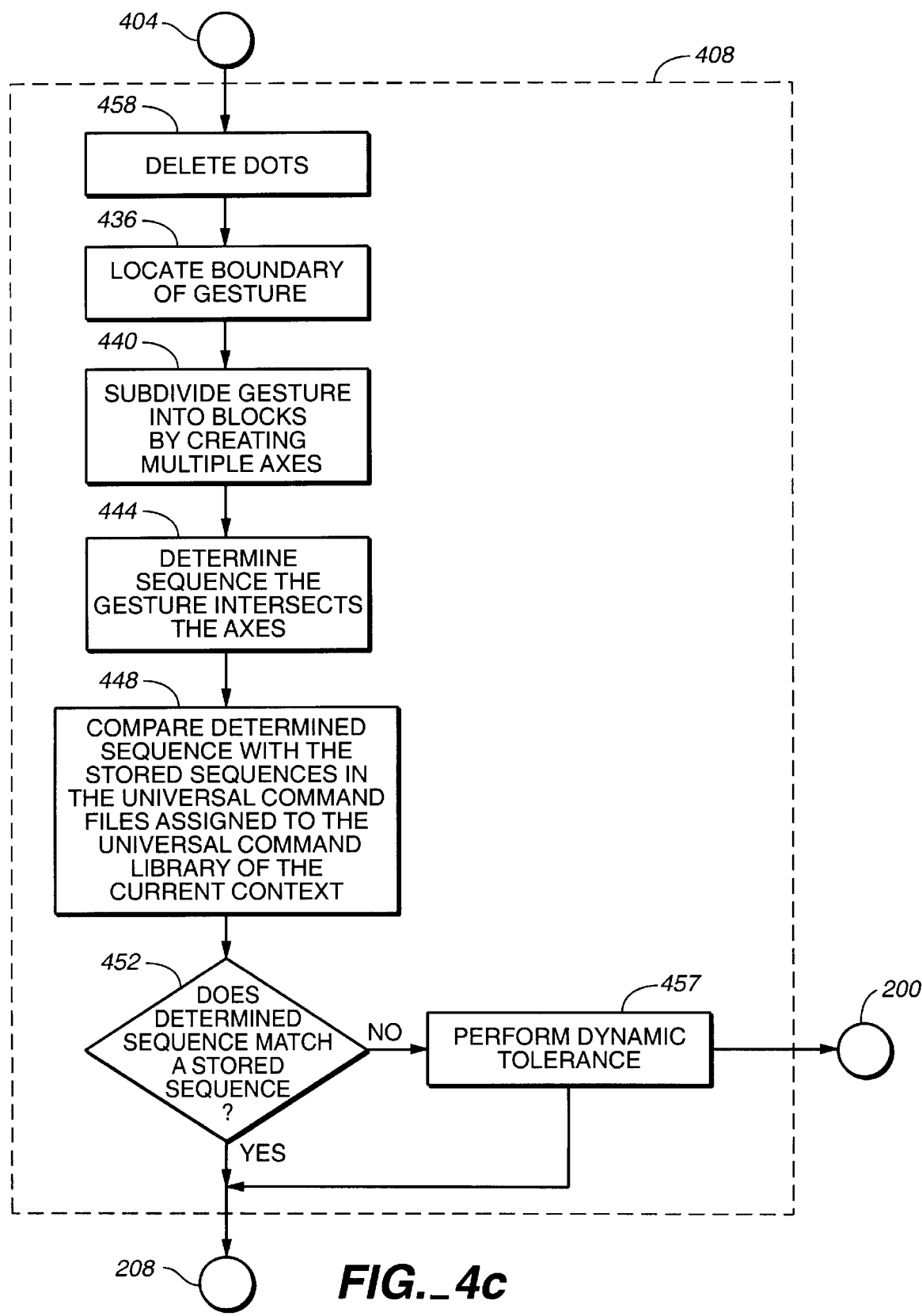
FIG._4c

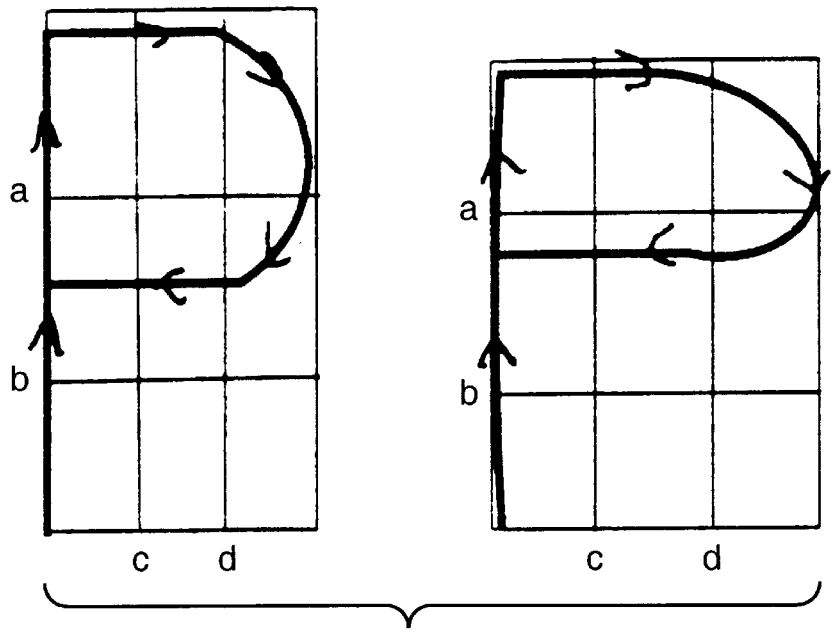
FIG._4d
Example Sequence:
"acabddc"
 0123456 - Element Indexes
Possible Swaps:
"ac"
"ca"
"bd"
Application of Bit Mask:          Results of Swapping:
           acabddc
n = 0      00 0                   acabddc
n = 1      00 1                   acadbdc
n = 2      01 0                   aacbddc
n = 3      01 1                   aacdbdc
n = 4      10 0                   caabddc
n = 5      10 1                   caadbdc
n = 6      11 0                   aacbddc
n = 7      11 1                   aacdbdc
          binary representation of n
               (all combinations)
FIG._4e

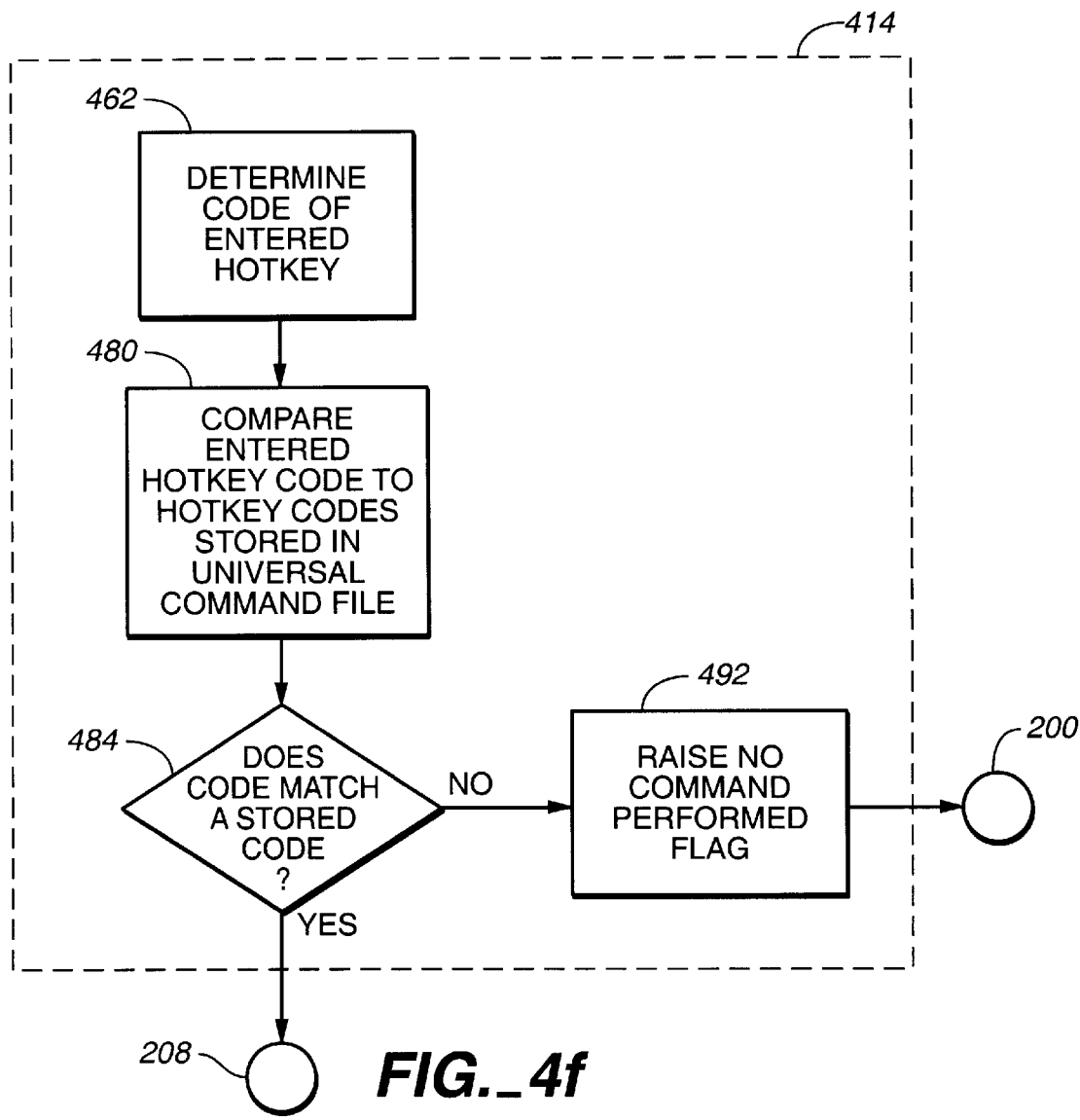
FIG._4f

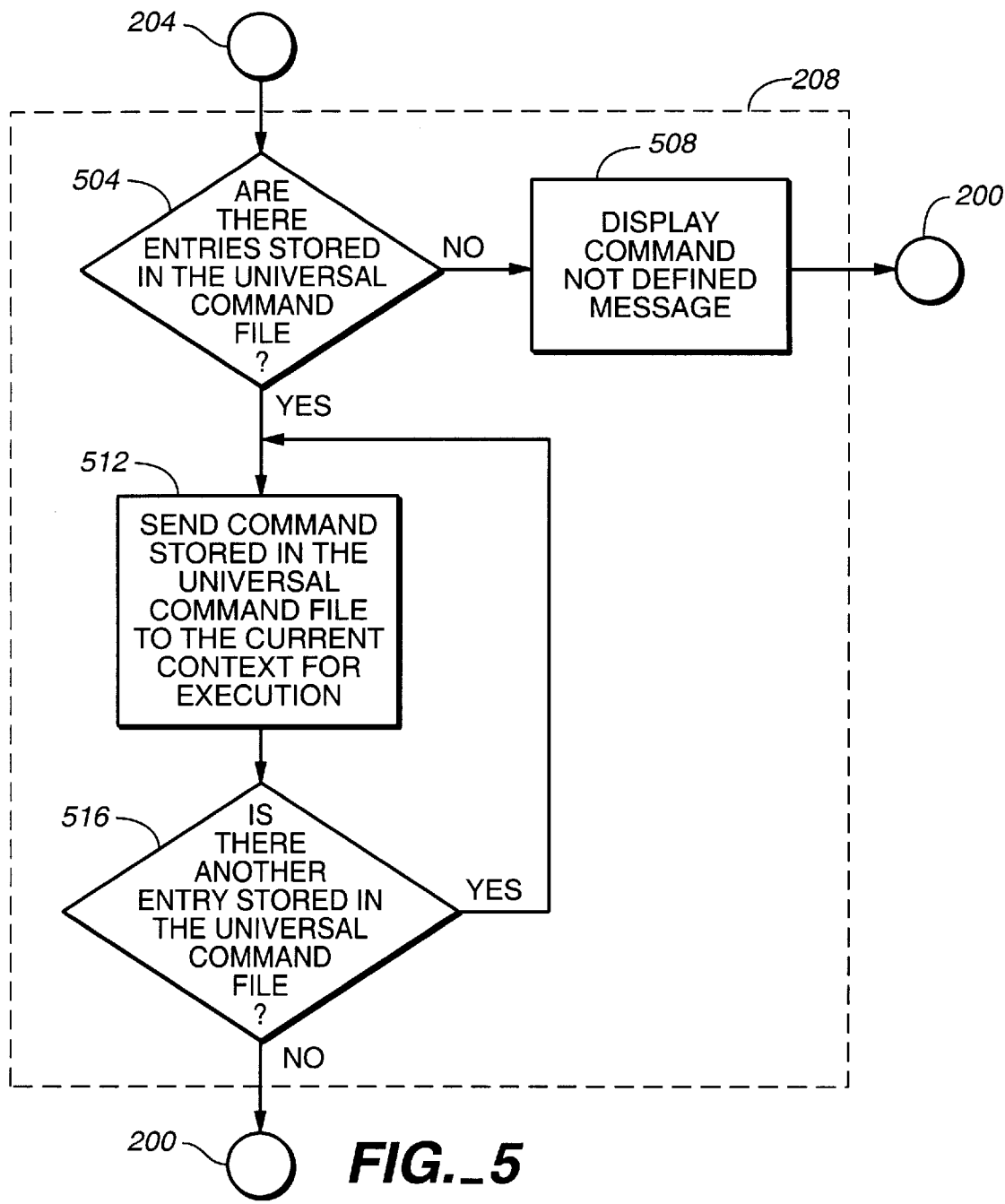
FIG._5

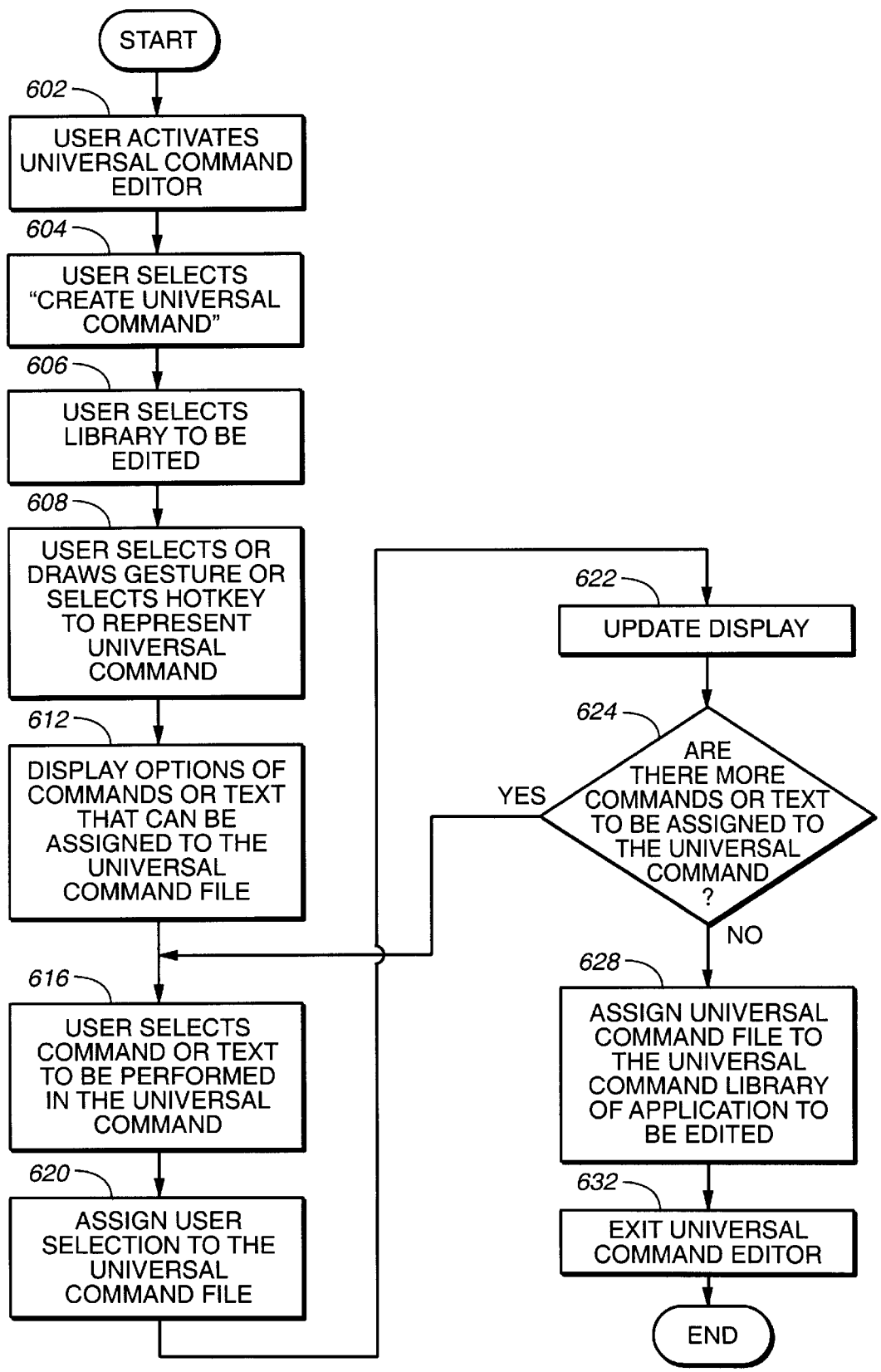
FIG._6a

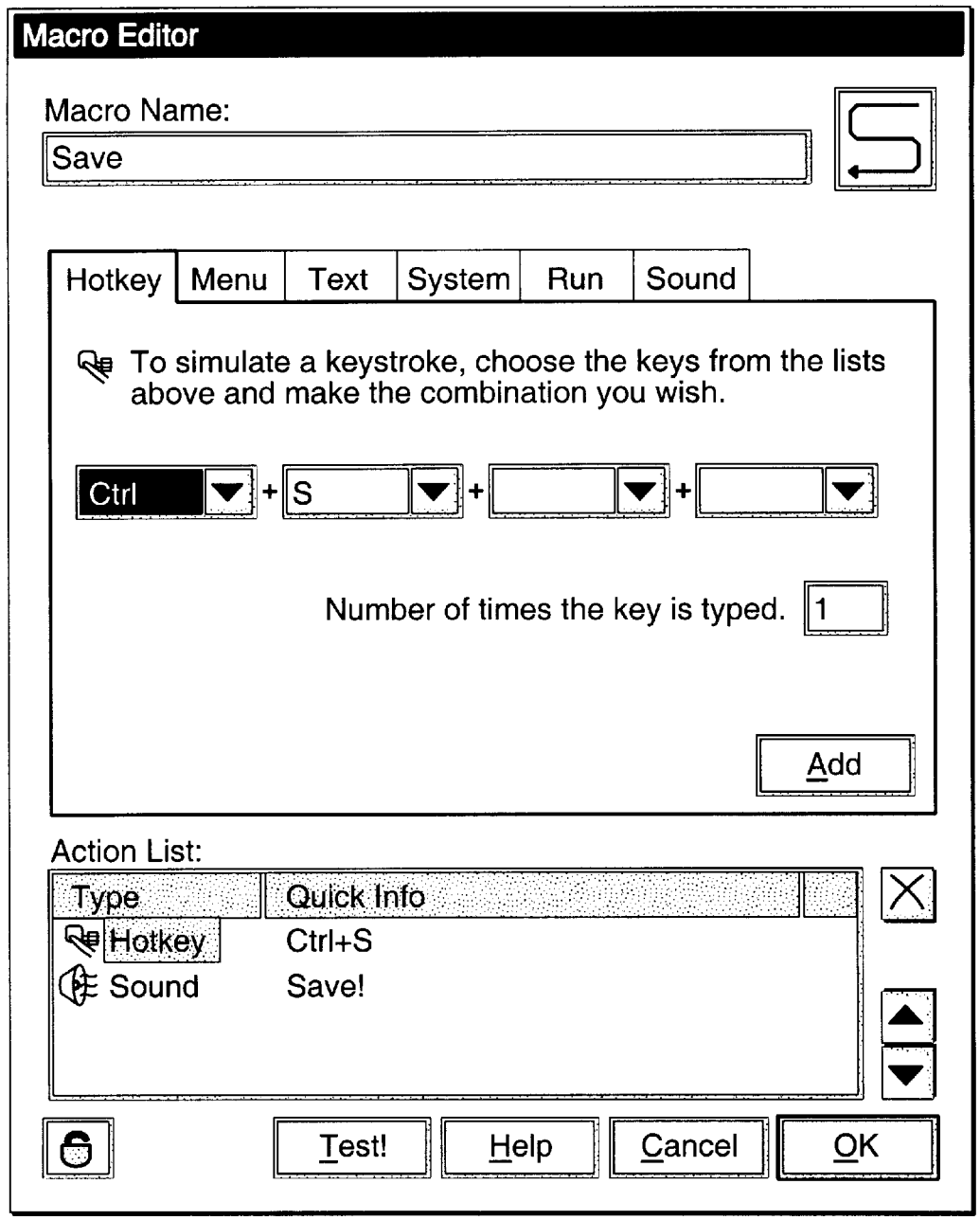
FIG._6b

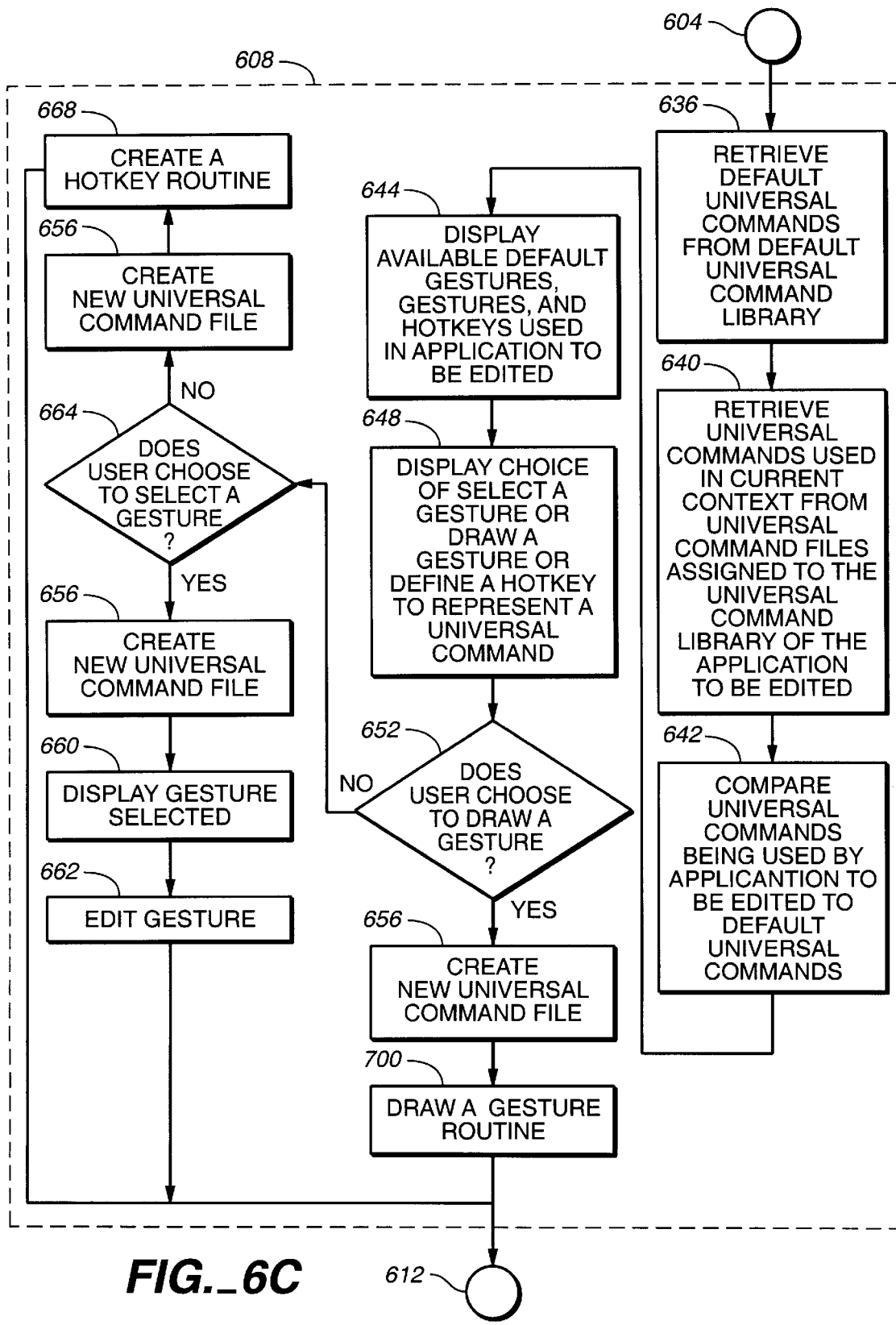
FIG._6C

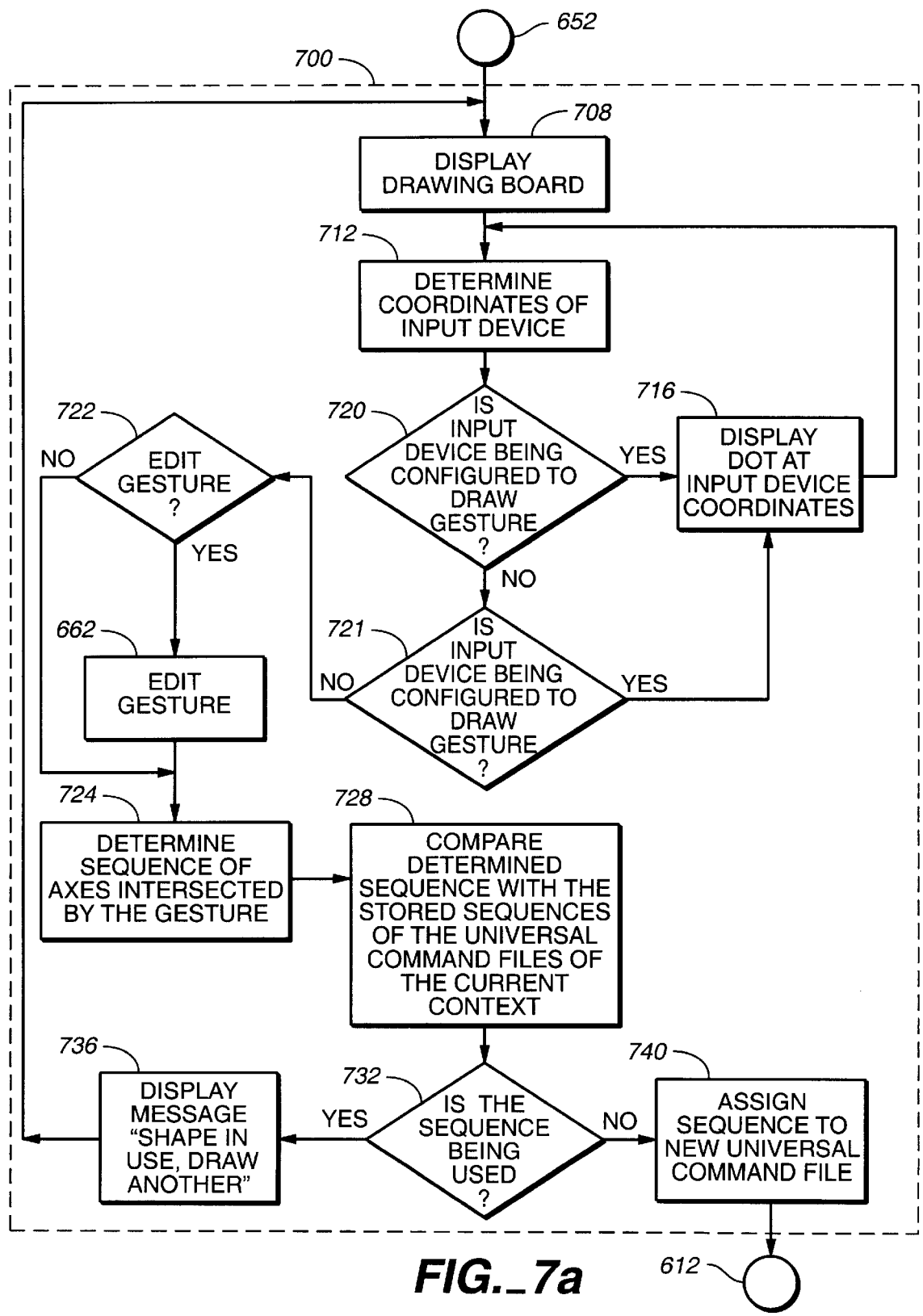
FIG._7a

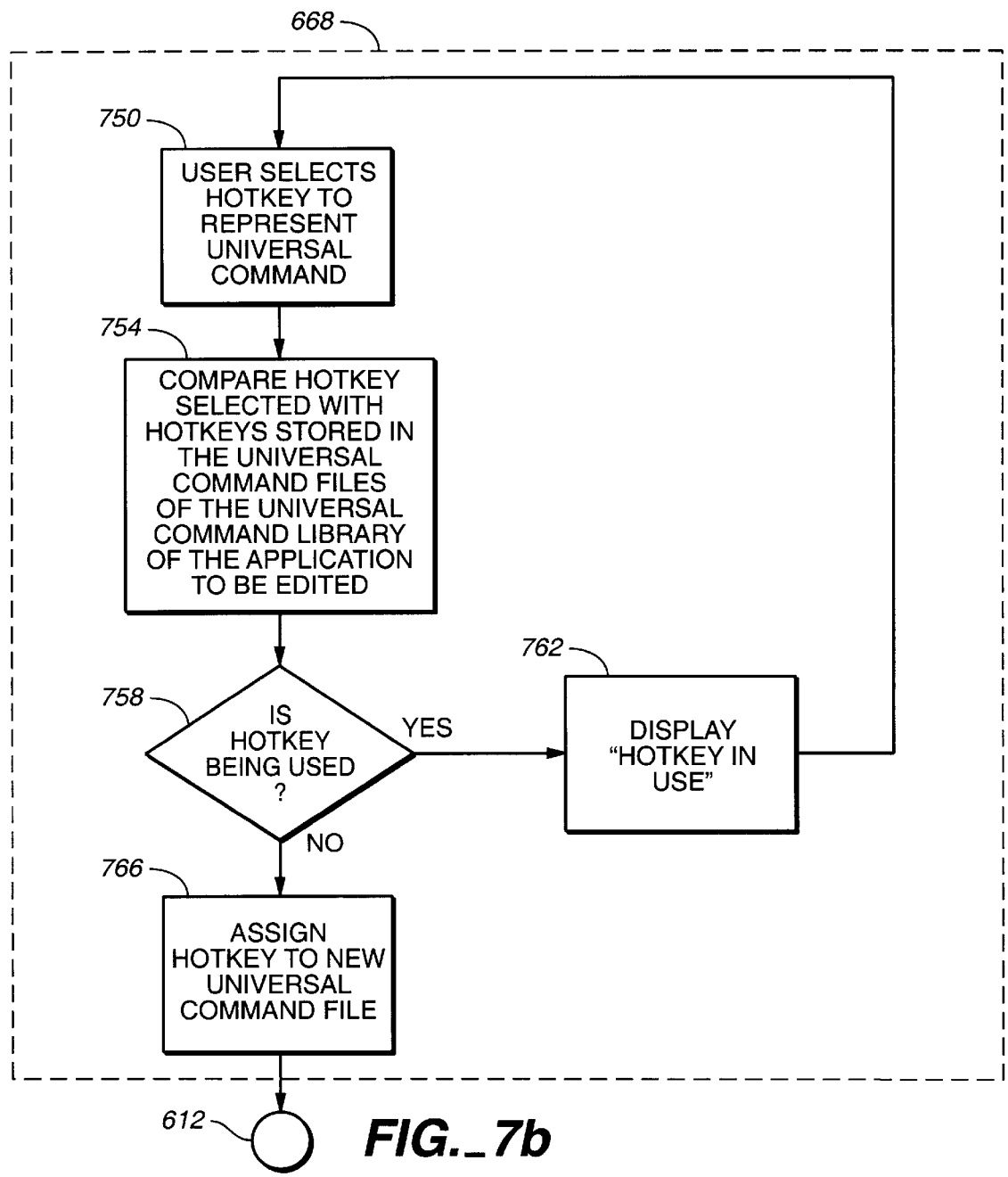
FIG._7b

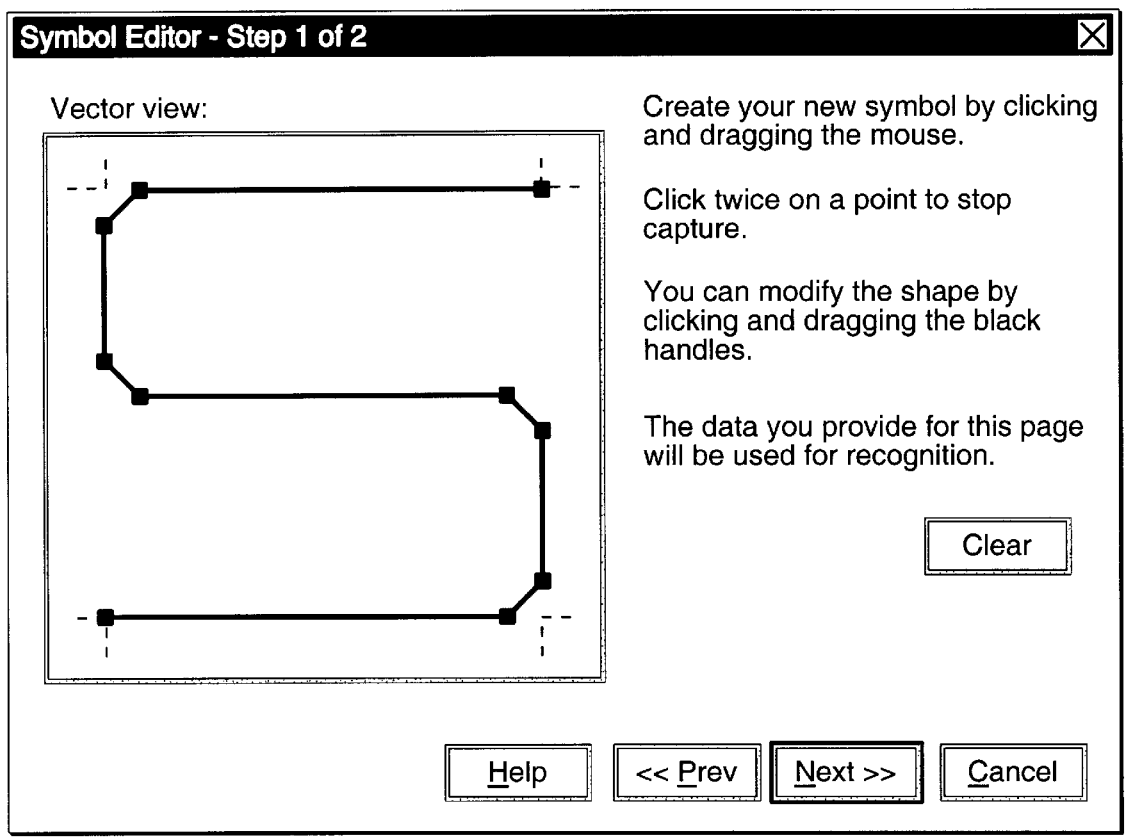
FIG._7c

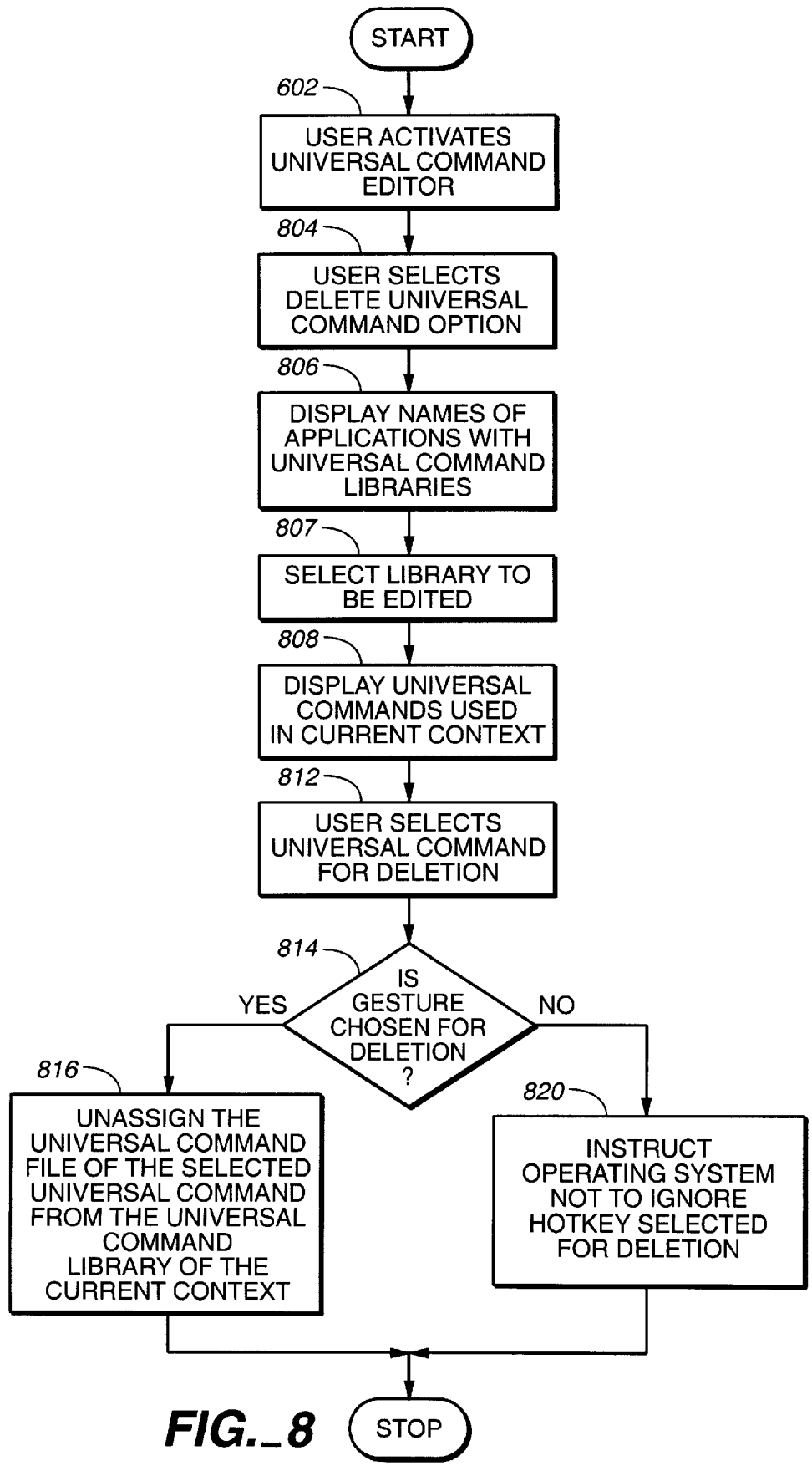
FIG._8

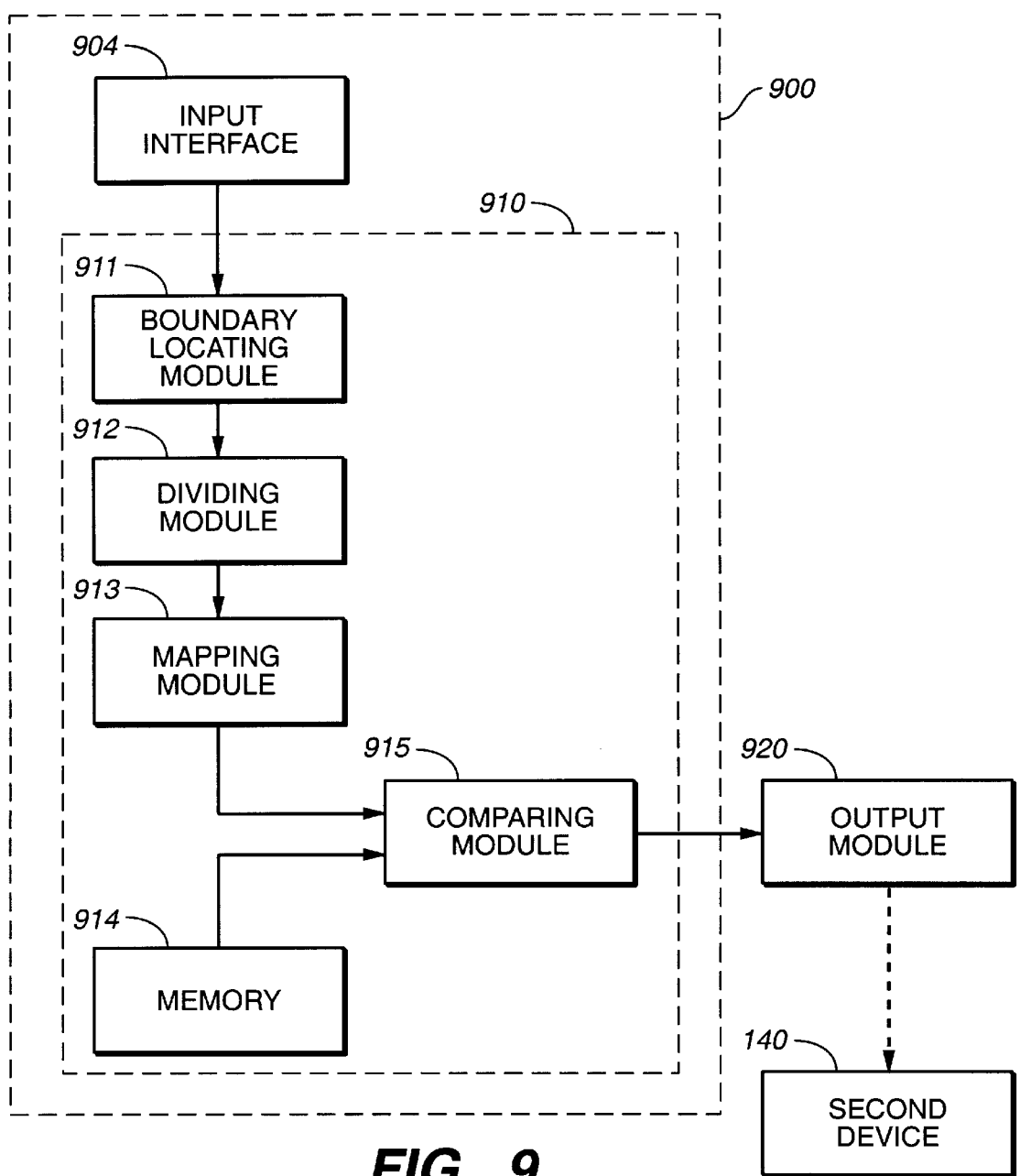
FIG._9

SYSTEM, METHOD, AND APPARATUS FOR GENERATION AND RECOGNIZING UNIVERSAL COMMANDS

BACKGROUND OF THE INVENTION

1. Field of the Invention

The present invention relates generally to methods for generating universal commands, in particular, to a system, method and apparatus for creating user-defined commands that are understandable by a second device or application that otherwise would not recognize the command issued by the user. Additionally, the present invention employs novel gesture recognition technology to recognize the commands by the user.

2. Description of the Related Art

Computer systems today are essential in the workplace and at home. Users of a typical computer use multiple applications on their computer. Often, users run multiple applications in the same work session. Applications designed for users often have shortcuts or quick command keys designed to make it easier to use their application. For example, a word processing program might enable the Ctrl-S combination to result in a save command. Or a spread sheet program may use a Ctrl-C to cut a block of data in order to be moved. These commands are very convenient to use, and typically after using an application for a period of time the user learns the short cuts.

Unfortunately, all applications do not use the same shortcuts for the same functionality. Applications are designed to perform different functions, are written by different companies, and in general do not follow a universal standard for quick command definitions. This forces the user to memorize or look up a different set of commands each time the user wishes to use a different application. When a user is switching rapidly between several contexts, this can become very burdensome and confusing. Also, the user is generally limited to the quick commands defined by the application. Often their quick commands are not intuitive for the user. For example, the creator of the program may believe that one quick command, for example ctrl-c, is easy to remember as copy, while a user may believe that ctrl-c, due to past experience is "cut" for the specific context of used. In the prior art, however, the user would be forced to relearn ctrl-c as cut. Also, the prior art quick commands are generally limited by keyboard inputs. These may not be descriptive enough for a user to remember.

There are more user friendly inputs, however, such as the technique of gesture recognition. Using gesture recognition, a user can draw a character on a screen, usually being restricted to using a pen-based system, and the computer system will recognize the character. Often, in the prior art, the user is forced to learn a pre-defined alphabet in order for the system to recognize the character. Thus, prior art gesture recognition techniques would not prove helpful in allowing a user to define a command or create a command that is easily remembered. Finally, a user may wish to employ an existing device, such as a television, with gesture recognition technology that will allow the user to input symbols to represent commands. However, the user may want to use gesture recognition without having to purchase a new television.

Therefore, there is a need for a system that can generate universal commands that will work on multiple applications, operating systems, and devices. There is a need for this system to allow the user to define their own commands and still have them be recognized by the device or application. There is a need for a universal command generator that uses input-friendly input commands, such as gesture recognition, which will allow users to create their own symbols or letters to represent universal commands, and yet still be highly accurate in recognizing the gestures. There is a need for this gesture recognition system to allow any symbol to be used as an input, and there is a need for the system to operate with conventional computer systems, without any special modifications, such as adding a cursor input device. Additionally, there is a need to be able to operate existing technological devices, such as a television, using gesture recognition without altering the device itself.

SUMMARY OF THE INVENTION

In accordance with the present invention, a universal command generator is disclosed. The universal command generator overcomes the problems with the prior art by using an improved method of converting a user input into commands that are recognizable by an application or device that ordinarily would not be able to interpret the user command. The converter is fully customizable by the user such that a given input can be made to perform the same function, regardless of the application that is active or the operating system being used. Similarly, the user can customize the same input so that it will initiate different, but fully definable actions, depend of on the context or application. The present invention employs novel gesture recognition technology to recognize gesture inputs by the user, thus providing the ease of gesture inputs to every application and device. The gesture recognition technology is not limited to a single set of characters, and yet is still highly accurate. Gestures can be symbols, characters, or any creation of the user. The input device can be any pointing device, including a mouse, graphic tablets, touchpad or touch screen, or any device that can control the position of a cursor, visible or not. The present invention also allows a remote device, such as a television, to be controlled by user-defined gestures. The preferred embodiment of the present invention comprises novel methods and apparatus that provide this functionality such as: a method for translating signals from an input device into commands operating on a context-sensitive basis, a method for recognizing and translating a command received from an input device into a command recognizable by a second context, and a device for interpreting and translating commands entered into a first device into commands that are understandable by a second device.

BRIEF DESCRIPTION OF THE DRAWINGS

FIG. 1 is a schematic of a preferred embodiment of the universal command generator system in accordance with the present invention.

FIG. 2 is a overview flowchart of the method for universal command generation in accordance with the present invention.

FIG. 3 is a flowchart of the preferred method of recognizing the current context in accordance with the system of the present invention.

FIG. 4a is a flowchart of the preferred method of recognizing a universal command in accordance with the system of the present invention.

FIG. 4b is a flowchart of the preferred method of determining if a gesture is being drawn in accordance with the present invention.

FIG. 4c is a flowchart of the preferred method of recognizing a gesture in accordance with the present invention.

FIG. 4d is a graphical representation of a script letter being segmented in accordance with the present invention.

FIG. 4e is a flowchart of one method of performing dynamic tolerance in accordance with the present invention.

FIG. 4f is a preferred method of executing hotkeys in accordance with the present invention.

FIG. 5 is a flowchart of the preferred method of translating a universal command in accordance with the present invention.

FIG. 6a is a flowchart of the preferred method of creating a universal command in accordance with the present invention.

FIG. 6b is a screenshot of a preferred user interface for selecting commands to be assigned to a universal command file in accordance with the present invention.

FIG. 6c is a flowchart of the preferred method of selecting a symbol or hotkey to represent a universal command in accordance with the present invention.

FIG. 7a is a flowchart of the preferred method of rendering a gesture in accordance with the present invention.

FIG. 7b is a flowchart of the preferred method of defining a relationship between a hotkey and a universal command in accordance with the present invention.

FIG. 7c is a screenshot of a preferred user interface in accordance with the present invention.

FIG. 8 is a flowchart of the preferred method of deleting a universal command in accordance with the present invention.

FIG. 9 is a schematic of a hardware embodiment in accordance with the present invention.

DETAILED DESCRIPTION OF THE PREFERRED EMBODIMENT

FIG. 1 depicts a preferred embodiment of the universal command generation system 10 of the present invention. The universal command generation system 10 preferably comprises an input device 104, a display device 112, a permanent storage device 156, a central processing unit 108, a first memory 144, and a second memory or object device 152. Those elements are preferably coupled to a common bus 148 in a Von Neuman architecture. A user 100 uses an input device 104 to communicate with an object device 152. The object device 152 can include an application 132 resident in memory 152 of a computer, an operating system 136 resident in memory on a computer 136, or a second device 140 such as a television, a CD player, or a stereo system. The second device 140 can be physically coupled to the databus 148, or it can be remotely coupled via infrared, or another conventional radio frequency communication method.

The object device 152 can be one object or multiple objects. The input device 104 can be any conventional input device, such as a mouse, keypad, keyboard, touchpad, graphics tablet, touch screen, or any input device capable of controlling the position of a cursor. The input device 104 is coupled to a data bus 148. The data bus 148 is coupled to a central processing unit (CPU) 108. The CPU 108 may be any one of the conventional processors on a microcontroller, for example, manufactured by Intel or Motorola. The CPU 108 is coupled to a set of memory modules 144, permanent storage 156, and a display 112. The operating system 136 can be any conventional operating system, such as a Windows (TM), Unix (TM), or OS/2 (TM) operating system. An operating system 136 is coupled to the CPU 108 through a databus 148, and provides an interface for the user 100 to interact directly with the CPU 108 by inputting commands, such as save file, or minimize window, display available memory, etc. Applications 132 can be any conventional applications, such as Word (TM), WordPerfect (TM), Corel Draw (TM), Lotus 1,2,3 (TM), and can be located in memory 152. Typically applications are coupled to the operating system, which translates the application instructions into instructions for the CPU 108. Applications can also be directly coupled to the CPU 108 through the databus 148. Applications can be operated by the user 100 by issuing application-defined commands such as cut, paste, copy, draw, etc.

Preferably, the memory 144 stores modules containing libraries used by the system of the present invention. The libraries are preferably contained in separate memory modules, and are coupled to the data bus 148. Memory module 116 contains libraries of universal command files for the applications stored in memory 152. Memory module 120 contains a library of default universal commands. Memory module 124 contains libraries of universal command files for the operating systems 136 being used by the CPU 108. Memory module 126 contains a library of symbols used by the user. Memory module 128 contains routines whose functionality is described in FIGS. 2–5, and will be described below. Universal command libraries 116, 124 store universal command files assigned to each application or operating system. Each universal command file has a gesture and/or a hotkey sequence contained within it. The sequence assigned to the universal command file is unique to its library. Each file also has one or more entries assigned to it. An entry in a universal command includes any command used by an application or operating system, a text string the user wants displayed, a sound file that the user desires to hear, or any combination of the above such as a macro. Those skilled in the art would know that other types of commands or entries could also be used as universal commands. An entry in a universal command file may also include a command recognized by a second device 140, such as increase volume, skip disc, etc. Each universal command can have as many entries as the user 100 desires. The entries can be stored in whatever order the user 100 desires. The library of independent symbols 126 contains all the symbols the user may draw and assign to the library 126. Once in the library 126, the symbols are available to be assigned to a universal command created by the user 100. The library of default universal commands 120 is described in further detail below.

FIG. 2 shows an overview of the operation of the preferred embodiment of the present invention. In step 201, the user 100 uses the input device 104 to send an input signal to the object device 152. In the prior art, the user would have to remember the correct input signal to perform the desired command for the specific context the user was working within. For example, in a computer system running multiple applications, the user would need to remember that ctrl-s is save in a word processing application, but that ctrl-s may be scroll in a web browsing application.

In accordance with the present invention, the system 10 dynamically recognizes the current context 200 of the input device 104. This is important for systems having multiple contexts. A context includes an application 132, an operating system 136, or a second device 140. However, if the system has only one context, then the system may not need this functionality. After recognizing the current context, the system recognizes a universal command 204 entered by the user 100. If the input signal is not a universal command, the input signal is routed to the current context for processing.

In the preferred embodiment, the universal command is preferably entered as a gesture. A gesture can be any character, symbol, or other creation of the user. However, the universal commands may also be keystrokes or combinations of keystrokes.

After recognizing the universal command 204, in the preferred embodiment the system translates 208 the user's universal command into a command, commands, text strings, or other information recognized by the current context. The translated universal command is sent (or string of commands and data produced by the translation) to the current context to generate the desired output 212.

FIG. 3 depicts a flow chart showing more detail of a preferred method for recognizing 200 the current context and dynamically and automatically loading the corresponding universal command libraries. In the present invention, the user may have several contexts stored in the memory 152 of the system 10. When the user moves the input device 104 over an active context, the system 10 recognizes the context and loads the library of universal commands corresponding to that context into memory. More specifically, in the preferred embodiment, the system 10 first determines 304 the coordinates of the input device 104. These coordinates are generally x-y coordinates showing the location of the input device 104 in relation to the active area of display or they could be the cursor location if the keyboard is providing the input. In a Windows environment, for example, the system 10 can constantly query the Windows operating system for the location of the input device 104, in this case, a mouse-type controller 104. In a second embodiment, the system 10 can identify the current context by asking the operating system which context is currently active. This can be a user-defined embodiment, allowing the user to select whether the system 10 operates dynamically or only upon activating a context.

After determining the input device 104 location, the system 10 preferably identifies the current context by determining what context the input device 104 is located over 308. In a system 10 of multiple contexts, the input device 104 will always be over one context, for example, an operating system context or ones of the applications having a window on the display device 112. Once the current context is determined, the system 10 then retrieves information 312 concerning the current context, such as the identification of the context. In a Windows environment, the contexts are displayed in windows, and the system 10 can use the location information of the input device 104 to query the operating system regarding what context window currently overlapped by the input device 104 location. The operating system 136 will return the handle of the window, which will allow the system 10 to retrieve whether the current context is a child window of a parent application. If the current context is a child window, then the system 10 will find the top-level parent window of the child window. Once the handle of the top-level parent window is retrieved, the operating system is asked for the name of the application, the class of that parent window, and will thus recognize the current context.

After identifying the current context in step 308, the system 10 then checks to see if the universal command library of that context is loaded 320 in the memory 116, 124. Each application 132 or operating system 136 will have a universal command library memory module 116, 124 associated with it. This library will contain the universal command files used by that application or operating system and information about the corresponding context, for recognition. If the library is not loaded, the system 10 will load the corresponding library 328. However, if there are no libraries assigned to a context, a set of default universal commands are loaded 332. These default gestures can be any commonly used gestures such as S for save, D for delete, P for print, or symbols such as arrows or curves. The user can later modify the default universal command library to suit his or her own needs. In one embodiment, hotkeys can be used to represent universal commands. In that case, the system 10 instructs 330 the operating system to ignore any hotkeys stored in the universal command library of the current context and thus overlaying the information entered with the keyboard, accessing it before all other applications. After loading the corresponding library, or a default library, the system 10 is ready to interpret universal commands.

As shown in FIG. 4a, in the preferred embodiment, the system 10 distinguishes between universal commands that are keyboard entries and universal commands that are gestures. After determining that a gesture is being drawn 404, the system 10 then executes the Gesture Execution module 408. If the system 10 determines that a hotkey has been input, then the hotkey execution module 414 is called. If the system 10 determines that no hotkey has been input, then the method moves to step 212 and output is generated by the current context without processing in accordance with the present invention.

FIG. 4b shows more detail of a preferred embodiment of determining if a gesture is being drawn, and if so, drawing the gesture on a display 112. First, the system 10 determines whether an input device 104 is being configured for gesture drawing 420. In one embodiment, if an input device 104 is a mouse, then the system 10 would determine if a right mouse button is being pushed. Those skilled in the art will realize that a variety of other combination of keyboard and mouse inputs could also be used. If an input device 104 is being configured for drawing a gesture, the system 10 draws a dot 424 at the current location of the input device 104. The system 10 then checks if the device is still configured for drawing a gesture 428. If it is, then it draws another dot at the current location of the input device 104. In a preferred embodiment, the user 100 must depress the right mouse button and move the input device 104 to draw a gesture. When the input device 104 is no longer configured for drawing a gesture, the user has completed the gesture The gesture can be shown on the display 112 as it is drawn. When the user is done drawing, the symbol will be deleted, and the gesture execution module 408 is called.

In the preferred embodiment, the system 10 captures all input signals prior to being processed by any other component of the computer system. This avoids any conflict between an application's or operating system's definitions of input device configuration and the system 10 of the present invention's definitions of input device configuration. For example, in the Windows (TM) environment, if the right mouse button is used as the gesture drawing configuration, there might be a conflict between gesture drawing and the Windows definition of the right mouse button creating a pop-up menu. However, the system 10 in the preferred embodiment will receive the input device configuration prior to the operating system. It will simulate the operating system command if it determines that the user intended to create a pop-up menu. Otherwise, it will allow a gesture to be drawn.

At this point, the system 10 is ready to recognize the gesture representing the universal command 408. FIG. 4c shows a preferred embodiment of gesture recognition in accordance with the present invention. Preferably, the first step is to delete the dots of the drawn gesture 458. Then, the system 10 will locate the boundaries 436 of the drawn gesture. In the preferred embodiment, this is accomplished by placing a bounding box around the gesture. Next, the box is subdivided 440 into blocks by creating multiple axes. In a preferred embodiment, two vertical axes are drawn equidistant from the left and right side of the bounding box and each other. Two horizontal axes are drawn equidistant from the top and bottom of the box and each other. Each axis has a label. In one embodiment, the two horizontal axes (including the perimeter axes) are labeled a and b. The two vertical axes are labeled c and d. Then the sequence in which the input signal intersects the axes is determined. For example, as shown in FIG. 4*d*, if the user drew a "P" by drawing a vertical stroke and then a semi-circular stroke, the sequence, for a perfectly drawn P. would be "bacdadc", assuming the user began drawing the P at its bottom.

In a preferred embodiment in accordance with the present invention, the system 10 also detects straight lines. Straight lines are important to detect separately because users 100 rarely draw lines straight. Therefore, the system 10 can separately recognize a straight line. After the boundary box is created around the gesture, the height to width ratio of the box is calculated. If the box height to width ratio is less than a fixed value for a vertical line, or greater than a fixed value tor a horizontal line, it is assumed that the user intended to draw a straight line. The fixed value is a predefined width to height ratio, such as 1 to 4. No axis intersection calculations are needed; instead, the system 10 will search for a universal command file stored in the universal command library of the current context that is also labeled a straight line, and execute that command in accordance with the method described below.

Additionally, in another embodiment, the system 10 can distinguish between a straight line and a line that was drawn on top of itself. After determining that a gesture is a straight line, the system 10 will compare the startpoint of the gesture to the endpoint of the gesture. If they are located within the same region, then the system 10 determines that the gesture was a line drawn on top of itself. This gesture may have special meaning for the user, and the system 10 searches the universal command files for a file tagged as a the line drawn on top of itself gesture, and sends the entries associated with that universal command file.

The system 10, after determining the sequence the input gesture intersects the axes, then compares the determined sequence with the stored sequences in the universal command files assigned to the universal command library of the current context 448 which has been automatically and dynamically loaded into memory, as described above. In a system 10 with one context, the one library would always be loaded into memory. There is one universal command file for each universal command. Each universal command file has a unique gesture sequence assigned to it. This system 10 then determines whether any stored sequences match the determined sequence. If one does, then the dots drawn on the display are deleted 458, and the universal command file is translated 208. The gesture recognition technology is very tolerant. The second P looks dissimilar to the first P, yet it will still be immediately recognized because its sequence is also "bacdadc."

However, if the system 10 does not find a match, then it performs dynamic tolerance 457. Dynamic tolerance is preferably performed as described in FIG. 4*e*. The sequence the gesture intersects the axes is a sequence of elements in a string, such as "acabddc" If the drawn gesture does not exactly match a stored perfect gesture, then the gesture is modified until a perfect match is found. The misdrawn gesture is transformed, by changing its shape, until its shape matches the shape of the stored gesture it was meant to be. The system 10 accomplishes this by repeatedly swapping the positions of the elements in the determined sequence until a match is found, no match is found, or a pre-defined swap limit is met. The swapping process begins by finding the indexes of the elements of the sequence that can be swapped. Similarly oriented axis intersections will not be swapped. Thus, only those elements next to an element of opposite orientation are indexed to be swapped. For example, as shown in FIG. 4*e*, for a string "acabddc", the only possible swap pairs are a–c, c–a, and b–d. Once the elements that can be swapped are determined, the system 10 calculates the number of possible combinations of swaps that can be made. The number of combinations are calculated by calculating 2 to the power of x, where x is the number of possible swaps. The base 2 is used because there are only two possibilities for swapping: swap, or no swap. For example, as in FIG. 4*e*, if there are three possible swaps, then there are 8 possible combinations of the elements in that sequence. The system 10 then sets a counter from one to the number of possible combinations. In our example, the counter would go from 0 to 7. Next, the system uses the binary representation of the counter value and applies it using a bitmask to each indexed element in the sequence. Only the indexed elements that can be swapped that are also marked by a 1 will be swapped. Sometimes, as shown in FIG. 4*e*, there may be multiple swaps to be performed in one counter loop. One skilled in the art would realize that modifications can be made to this system without altering its functionality, such as having the counter count backwards, or swapping in a different order.

After a swap is made in one counter loop, the new swapped sequence is compared to the stored sequences of the universal command files of the universal command library of the current context. If there is a match, then the universal command is translated 208. If there is no match, then the system 10 asks whether a preset swapping limit has been met 474. If it has, then the message, "No Command Performed" is displayed 476, and the system 10 returns to recognizing the current context 200. If the limit has not been met, then the counter is increased, and the processed is repeated until either all of the possible combinations have been compared or the preset limit is reached. The user can define how tolerant the system 10 is to misdrawn gestures by setting the number of swaps that can be performed. The more swaps that are allowed, the more tolerant the system 10 is. The swapping method in accordance with the present invention provides for highly accurate and flexible gesture recognition without limiting the user to a single alphabet. Since the user can create gestures to represent universal commands, as described below, the user can create whatever symbol the user desires to represent a command and still have it recognized by the object device 152. Thus, the user can create symbols that are easy to remember for the user, and apply them in every context.

If the universal command is determined to be a hotkey 412, as shown in FIG. 4*a*, then the hotkey execution module 414 is called. In the preferred embodiment, hotkeys can be used as universal commands. When a hotkey is entered, the hotkey is processed in accordance with FIG. 4*f*. The code representing the keyboard input is determined 480. The system 10 compares the determined code 484 to the stored hotkey codes in the universal command files of the universal library of the current context. If no matching sequence is found 488, a "No Command Performed" flag is raised, and the system 10 returns to recognizing the current context 200. If a match is found, then the system 10 moves to the translate universal command module 208.

FIG. 5 shows a preferred embodiment of the translate universal command module 208. Each universal command file may have several entries. These entries can be commands, such as save, or cut, or delete, or they can be text strings, menu commands, sound files, launching an application or any other event performed by an application 132 or operating system 136. The command can also be change channel, skip disc, or any other command understandable by a second device 140. After recognizing the universal command, and finding the corresponding universal command file, the system 10 preferably determines if there are any entries 504 in the universal command file. If there are no entries, then the system 10 displays a "Command Not Defined" message 508 and returns to step 200. If there is an entry, the system 10 sends the command or text string to the current context for execution 512. In this embodiment, the system 10 then determines whether there are other entries 516 in the universal command file. If there are, it returns to step 512 and sends those entries to the current context for execution 520. After all the commands have been sent, the system returns to step 200. The current context generates the requested output 212 after receiving the commands.

FIG. 6a shows a system 10 for generating universal commands, in accordance with a preferred embodiment of the present invention. The user 100 activates the universal command editor 602. This may be enabled by a right mouse double click in a Windows (TM) environment, or by any other means of starting a program. A menu can be displayed here, displaying options for the user to select between. The user 100 will select the "Create a Universal Command" 604 option. The user 100 then selects 606 or specifies the library of universal commands to be edited. At this point, in the preferred embodiment, the user can select an existing gesture from a library of symbols to represent the new universal command, the user may draw a new symbol to represent a universal command, or the user may select a Hotkey to represent a universal command 608. After selecting an option, the system 10 then displays the options 612 of commands or text that can be assigned to the universal command. A screen shot is shown in FIG. 6b of a preferred embodiment of the user interface used to display options.

In one embodiment, the user 100 will select the command or text or menu function the user 100 desires to execute first 616, and the choice is assigned 620 to the universal command file 620. The interface is updated to reflect the choice made 622, and the user is allowed to add more commands or text to the universal command 624. The order in which the user assigns commands is the order in which the commands will be executed, as described above. The user can change the order of or even delete the commands at any time. After all of the commands or text are assigned to the universal command file, the universal command file is stored and assigned to the universal command library 628 for the application to be edited. After assigning the command to the appropriate library, the universal command editor is exited 632. The user can use this feature to assign the same gesture to perform a single command in all applications. For example, if a user wanted an S to mean save for every application, the user can simply create the S gesture as a universal command to save for one application. Then, the user could create the save universal command for every application even though the original access to that command is different in several applications and assign the S symbol to it. Afterwards, the user will only have to remember that S means save, regardless of what specific context the user is in.

FIG. 6c shows more detail of a preferred embodiment of the user selecting to draw a gesture, use an existing gesture, or use a hotkey as the universal command 608. First, the default gestures and hotkeys from the default universal command library are retrieved 636 and loaded into memory. Next, the gestures and hotkeys being used in the application to be edited are retrieved 640. They are compared 642 to eliminate any default gestures or hotkeys in use by the application to be edited. Then, the unused default gestures and hotkeys are displayed, and separately the gestures and hotkeys used by the application to be edited are displayed 644. The user 100 can now see what has been used and what is available. Of course, the user need not use a default gesture or hotkey, but can create a totally new gesture or hotkey if the user chooses.

The user 100 is now shown a choice of drawing a gesture, selecting an unused default gesture, and defining a hotkey to represent the universal command 648. If the user chooses 652 to draw a gesture, then a new universal command file is created to store the information 656, and the draw a gesture routine 700 is called. If the user chooses to select an existing gesture 664, then a new universal command file is created to store the information 656, the gesture selected is displayed 660, and the user is given an option to edit the gesture 662. If a user 100 selects to create a hotkey 664, then a new universal command file is created to store the information 656, and the create a hotkey routine is called 668.

In one embodiment of the present invention, the user 100 can simply draw a symbol independently of a universal command. After doing so, the drawn symbol is stored in a library of symbols assigned to the current context. When the user wants to create a universal command in that context at a later time, the drawn symbol is shown to the user as an available symbol to have a universal command assigned to it.

FIG. 7 shows a preferred embodiment of the creating a gesture 700. A drawing board is displayed 708. Preferably, the drawing board is in a large window. The user 100 will place the input device 104 in the location the user wishes to start from and then draws the gesture. The coordinates of the input device 104 are tracked 712 and dots are displayed at those coordinates 716. In an embodiment where a mouse is being used, the use of the right mouse button can be tracked 720 to know when the user is signalling that they are drawing. However, any button on a mouse could be used, and any other input device 104 could be used and tracked to draw a gesture in accordance with this invention. Gestures are composed of line segments which make up the gesture. The user draws several lines that will comprise the gesture. Each line is shown segmented by handles which can later be used for editing the shape of the gesture. The draw a gesture routine 700 can be used in conjunction with generating a universal command or with drawing a symbol independently of generating a universal command, as described above.

After completing the drawing, the user is given an option 722 to edit the gesture. If the user wishes to edit the gesture 722, then the edit gesture routine 662 is called. To edit a gesture, the gesture is displayed with handles marking the joining together of the line segments that were used to comprise the gesture. FIG. 7c shows a screen shot of an editing gesture interface. The user can move the handles to alter the shape of the figure to whatever shape is desired. After editing or if the user chooses not to edit, the gesture is analyzed as described above to determine what sequence of axes it intersects. After determining the sequence 724, the determined sequence is compared 728 to the stored sequences located in the universal command files of the application to be edited. If this sequence is being used 732, then the message is displayed, "Shape in Use, Draw Another" 736 and the user 100 is given another opportunity to draw a gesture. If there is no match, then the sequence is assigned 740 to the newly created universal command file. The system 10 then displays the options of commands or text to be assigned to that universal command 612.

FIG. 7b displays a preferred embodiment of the create a hotkey to represent a universal command routine 668. Here, the user selects a hotkey to represent the universal command 750. The hotkey chosen is compared with the hotkeys stored in the universal command files of the universal command library of the application to be edited 754. If the hotkey is being used 758, then the message "Hotkey In Use" 762 is displayed and the user 100 is given a chance to select another 750. If the hotkey is not being used, then the hotkey is assigned to the newly created universal command file 766. The system 10 then displays the options of commands or text to be assigned to that universal command 612.

FIG. 8 shows a preferred embodiment of deleting a universal command. The user 100 activates the universal command editor 802. The user selects the delete command option 804. The system 10 displays the available applications with universal command libraries 806. The user selects the library in which the user wants to delete the command 807. The universal commands of that library are displayed 808. The user selects a universal command for deletion 812. If a gesture is chosen, then the universal command file is deleted from the universal command library 816. If a hotkey is chosen, the central processing unit is instructed to process that hotkey if entered by the user 818.

The universal command generation technology outlined above is especially useful when applied to second devices, such as a television, a CD player, a handheld computer, or a stereo system. The apparatus as described in FIG. 1 can be embedded onto a single chip 900 as shown in FIG. 9. The chip can then be installed onto a remote control that allows gesture input, or onto the device itself. The user can use the user interface 904, which may be a writepad or touchscreen to generate a universal command, such as increasing volume by drawing a gesture or changing (browsing) a page. The user interface is coupled to a recognition module 910. The recognition module 910 is composed of several components. A boundary locating module 911 will locate the boundaries of the gesture in accordance with the above description. A divider module 912 will divide the bounded gesture into regions divided by axes. A mapping module 913 will map the order in which the gesture intersects the axes. Memory 914 will store a look up table holding a list of sequences and their corresponding commands recognizable by the second device. A comparing module 915 will compare the mapped input signal sequence to the stored sequences to find a matching sequence. When a match is found, the output module 920 will send the commands assigned to the matched sequence to the second device for processing. Thus, an increase volume gesture drawn by the user can be converted into an increase volume command recognizable by a second device, for example a television, CD player, or a stereo system. All commands recognizable by a television, or any second device 140 can thus be represented by gestures. Thus, in accordance with the present invention, the command conversion technology in conjunction with the gesture recognition technology can bring the capability of user-defined commands and user-friendly gesture input to nearly any technological device on the market, without necessarily having to make any alteration to the technological device itself. However, the chip can be installed on a new product to allow a user to have gesture recognition via an interface coupled to the device itself.

Thus, in accordance with the present invention, a user can define a single command that will execute any command on an application 132, operating system 136, or second device 140. In accordance with the present invention, libraries of universal commands are automatically and dynamically loaded responsive to the movement of an input device 104. Additionally, in accordance with the present invention, the user is able to designate a single command or another event to perform the same function on multiple applications, thus freeing the user from having to remember specific commands for specific applications. In accordance with the present invention, when a user switches back and forth between application, the user can use the same commands for both applications. The gesture recognition technology of the present invention allows the user to draw the commands using a standard input device 104, providing to the user the ease of gesture input for all of the user's command needs. The gesture recognition technology is highly accurate, using dynamic tolerance correction, but does not restrict the user to a set of pre-defined characters. The user can create any character the user desires to issue a universal command, without being limited to pre-defined alphabets. The user can store symbols independent of universal commands for later use with the universal commands. Additionally, the novel command conversion technology of the present invention allows gesture recognition capability to be applied to any remote device. Thus, any remote device 140 can now be controlled by a user-defined gesture, in accordance with the present invention.

While the present invention has been described with reference to certain preferred embodiments, those skilled in the art will recognize that various modifications may be provided. For example, different remote devices may be used, different operating systems may be used, or different algorithms for drawing the lines may be used consistent with the scope of this invention. These and other variations upon and modifications to the preferred embodiment provided for by the present invention which is limited only by the following claims.

What is claimed is:

1. In a system having multiple contexts, a method for translating signals from an input device into commands operating on a context-sensitive basis, wherein at least one universal command file is created and stored in a universal command library, and at least one universal command library is created and associated with at least one of the multiple contexts, and each universal command file contains a unique sequence and storage space to store at least one command, the method comprising:

determining coordinates of the input device;
   identifying the current context;
   loading the universal command library associated with the identified current context;
   recognizing a universal command input transmitted by the input device;
   differentiating between an operating system command and a universal command during the step of recognizing the universal command;
   correlating the recognized universal command input with a universal command file stored in the universal command library; and
   sending commands stored within the correlated universal command file to the current context for execution.

2. The method of claim 1, wherein the recognizing a universal command step further comprises the steps of:

determining whether a universal command is being transmitted by the input device;

responsive to determining that the universal command is being transmitted, drawing a graphical representation of the universal command responsive to the input signal;

creating a boundary box around the graphical representation;

subdividing the boundary box into regions separated by multiple axes; and determining a sequence of the input signal intersecting the axes.

3. The method of claim 2, wherein subdividing the boundary box further comprises the steps of:

generating a first and a second axes equidistant from the top and bottom sides of the boundary box; and generating a third and a fourth axes equidistant from the left and right sides of the boundary box.

4. The method of claim 2, wherein the correlating step comprises the substeps of:

comparing the determined sequence to a stored sequence associated with the at least one universal command file stored in the loaded universal command library; and performing dynamic tolerance until a matching sequence corresponding to a universal command is found.

5. The method of claim 4, wherein performing dynamic tolerance further comprises the steps of:

identifying an orientation of the first element in the determined sequence;

identifying an orientation of the next element in the determined sequence swapping the first and second elements of the sequence responsive to the first and second sequence elements having different orientations to provide a swapped sequence;

comparing the swapped sequence to the stored sequence associated with at least one universal command file stored in the loaded universal command library;

repeatedly swapping first and second elements of the sequence responsive to no match being found or the orientations of the first sequence elements being the same until all possible permutations have been swapped or a match is found.

6. The method of claim 5, wherein there is limit to the number of swaps that can be performed, and step of repeating comparing the swapped sequence comprises:

repeatedly comparing the swapped sequence until all possible permutations are swapped and compared or a match is found or the limit on the number of swaps allowed is reached.

7. The method of claim 1, wherein the input device is a keyboard, the loaded universal command library contains keyboard commands associated with at least one universal command file, there is an operating system protocol governing the system, and recognizing a universal command further comprises the steps of:

instructing the operating system not to process keyboard entries corresponding to the keyboard entries stored in the library; and comparing the keyboard input to a list of stored keyboard inputs to find a matching universal command file.

8. The method of claim 1, wherein sending commands further comprises the steps of:

sending an entry stored in the correlated universal command file to the current context for processing;

determining if the sent entry was the last entry in the universal command file; and repeatedly sending and determining until all entries in the universal command file have been sent.

9. The method of claim 8 wherein the entry contains text strings.

10. The method of claim 8 wherein one of the contexts is an operating system, and an entry contains a operating system command.

11. The method of claim 1, wherein the current context is identified based on locating coordinates of the input device.

12. The method of claim 1 wherein there is an operating system coupled to the system, a user can activate one of the multiple contexts, and the current context is identified by querying the operating system as to what is the active context.

13. A method for creating a new universal command, the new universal command is recognized for a specified context, and the method comprising the steps of:

loading a universal command file of the specified context;

creating a new universal command file;

displaying a window for drawing a universal command;

repeatedly drawing a line segment responsive to the input signal in response to the input device being configured for drawing until the input device is no longer configured for drawing;

subdividing the window into regions separated by multiple axes;

determining a sequence of axes intersected by the input signal;

comparing the determined sequence to a sequence correlating to the at least one universal command file stored in the loaded universal command library to find if an existing universal command file matches the input signal sequence;

performing dynamic tolerance if no matching sequence is found to determine if a matching sequence corresponding to a universal command file exists; and storing the determined sequence into the created universal command file if no match exists.

14. The method of claim 13 wherein options for commands to be assigned to the new universal command are displayed, commands are assigned responsive to the selection of an option, and the display is updated responsive to the assigning of a command.

15. A device for interpreting and translating universal commands into commands understandable by a second device, comprising:

a recognition module, for receiving an input universal command, further comprising:

a boundary locating module, coupled to input device, for locating the boundaries of a transmitted universal command;

a divider module, coupled to the boundary locator, for dividing the bounded universal command into regions divided by multiple axes;

a mapping module, coupled to the divider, for generating a sequence in which the input signal intersects the axes;

a memory, for storing a list of sequences, each sequence associated with one or more commands recognizable by the second device; and a comparing module, coupled to the memory, for comparing the generated sequence to the stored list of sequences to find a matching sequence; and an output module, coupled to the comparator, for sending the commands associated with the matched sequence to the second device.

16. The device of claim 15, wherein the recognition module further comprises:

a dynamic tolerance adjuster, coupled to the comparator, for adjusting the input signal to match a stored sequence if the generated sequence does not match a stored sequence.

17. The device of claim 15, wherein the modules are located on a single device.

18. The device of claim 15, wherein the first device is a remote control and the second device is a device capable of being controlled by a remote control.

19. A method for translating an input signal in the form of a gesture into a one or more commands recognizable by a computer system comprising:

receiving an input signal;

creating a boundary box around the input signal;

subdividing the boundary box into regions separated by multiple axes;

determining a sequence the input signal intersects the axes;

comparing the determined sequence to a stored list of sequences to find a stored sequence that matches the determined sequence;

performing dynamic tolerance if no matching sequence is found until a matching sequence is found; and sending a command understandable by the second device corresponding to the matching stored sequence.

20. The method of 19 wherein performing dynamic tolerance further comprises the steps of:

swapping a first and second elements of the sequence to produce a swapped sequence;

comparing the swapped sequence with the stored list of sequences;

repeatedly swapping the first and second elements of the sequence to produce at least one additional swapped sequence and comparing the additional swapped sequence responsive to the no matching sequence being found until all permutations have been swapped or a match is found.

21. The method of claim 20, wherein no swaps are made if the orientation of the sequence elements to be swapped are the same.

22. The method of claim 20, wherein there is a preset limit of swaps, and no swaps are made if the number swaps that have already been made exceed the preset limit.

23. The method of claim 19, wherein the step of determining a sequence recognizes straight lines by performing the steps of:

comparing a height and width ratio of the boundary box to a first predefined height and width ratio;

comparing the height and width ratio of the boundary box to a second predefined height and width ratio; and comparing the sequence the input signal intersects the axes to a stored list of sequences defined as straight lines to find a stored sequence that matches the determined sequence, responsive to the height and width ratio of the boundary box being less than the first predefined height and width ratio or greater than the second predefined height and width ratio.

24. The method of claim 23, wherein the stored list of sequence contains a sequence that is represents a line drawn on top of itself, and at least one entry is assigned to said sequence, wherein the step of determining a sequence recognizes a line drawn on top of itself by performing the steps of:

determining the region a start point of the input signal sequence is located within;

determining the region a end point of the input signal sequence is located within;

comparing the start point region and the end point region to determine if the start point and the end point are located in the same region; and responsive to determining that the start and end point are located within the same region, sending the entry assigned to the stored sequence that represents a line drawn on top of itself.

\* \* \* \* \*